US010620410B2

(12) United States Patent
Jang

(10) Patent No.: US 10,620,410 B2
(45) Date of Patent: Apr. 14, 2020

(54) ZOOM LENS SYSTEM

(71) Applicant: HANWHA TECHWIN CO., LTD., Seongnam-si (KR)

(72) Inventor: Jin Ho Jang, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 79 days.

(21) Appl. No.: 15/921,880

(22) Filed: Mar. 15, 2018

(65) Prior Publication Data
US 2019/0056571 A1 Feb. 21, 2019

(30) Foreign Application Priority Data

Aug. 21, 2017 (KR) .................. 10-2017-0105510

(51) Int. Cl.
G02B 15/163 (2006.01)
G02B 13/00 (2006.01)
G02B 15/177 (2006.01)

(52) U.S. Cl.
CPC ......... *G02B 15/163* (2013.01); *G02B 13/009* (2013.01); *G02B 13/0045* (2013.01); *G02B 13/0085* (2013.01); *G02B 15/177* (2013.01)

(58) Field of Classification Search
CPC .. G02B 15/163; G02B 13/009; G02B 15/177; G02B 13/0085; G02B 13/0045
USPC ................................ 359/642, 676, 694, 695
See application file for complete search history.

(56) References Cited

U.S. PATENT DOCUMENTS

| 5,583,701 | A | * | 12/1996 | Yamanashi | .......... | G02B 15/173 359/676 |
|---|---|---|---|---|---|---|
| 6,992,835 | B2 | | 1/2006 | Iwasawa et al. | | |
| 7,391,578 | B2 | | 6/2008 | Yamada | | |
| 7,538,953 | B2 | | 5/2009 | Enomoto | | |
| 9,435,988 | B2 | | 9/2016 | Jang et al. | | |
| 9,726,863 | B2 | | 8/2017 | Noda et al. | | |

FOREIGN PATENT DOCUMENTS

| JP | 2004-226803 | A | 8/2004 |
|---|---|---|---|
| JP | 3589555 | B2 | 11/2004 |
| JP | 2005-37727 | A | 2/2005 |
| JP | 2008-298924 | A | 12/2008 |
| JP | 4601430 | B2 | 12/2010 |
| JP | 2016-90748 | A | 5/2016 |
| KR | 10-2015-0135919 | A | 12/2015 |

* cited by examiner

*Primary Examiner* — Tuyen Tra
(74) *Attorney, Agent, or Firm* — Sughrue Mion, PLLC

(57) ABSTRACT

A zoom lens system according to an example embodiment includes, sequentially from an object side to an image plane side along an optical axis, a first lens group having a negative refractive power and including at least one doublet lens, the doublet lens including two lenses, a second lens group having a positive refractive power, and a third lens group having a positive refractive power, wherein the first lens group and the second lens group are configured to move along the optical axis to perform zooming and focusing, and the zoom lens system satisfies 3.0<Vdf/Vdr<6.0, where Vdf denotes an Abbe number of a lens arranged at the object side in a doublet lens, and Vdr denotes an Abbe number of a lens arranged at the image plane side in a doublet lens.

18 Claims, 9 Drawing Sheets

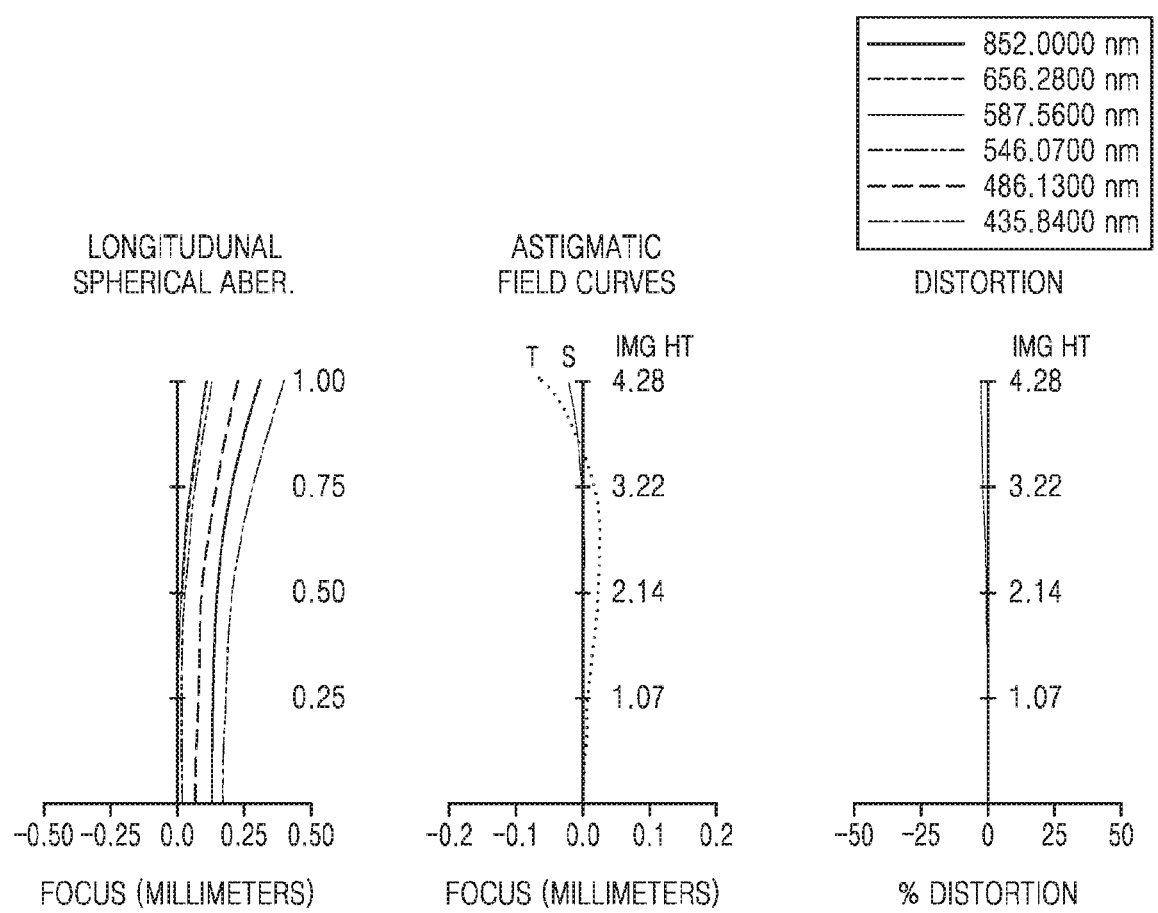

ZOOM LENS SYSTEM

CROSS-REFERENCE TO THE RELATED APPLICATION

This application claims priority from Korean Patent Application No. 10-2017-0105510, filed on Aug. 21, 2017 in the Korean Intellectual Property Office, the disclosure of which is incorporated herein in its entirety by reference.

BACKGROUND

1. Field

One or more example embodiments relate to a zoom lens system, and more particularly, to a three-group zoom lens system.

2. Description of the Related Art

Recently, there has been increasing demand for reducing or minimizing the size of imaging apparatuses such as digital cameras, video cameras, and surveillance cameras.

However, to attain high-resolution imaging devices such as a charge coupled device (CCD) or a complementary metal oxide semiconductor (CMOS) included in an imaging apparatus, it is advantageous for such an imaging device to have a large area and to include a greater the number of pixels. Accordingly, a size of an optical system focusing light on the imaging device may also increase, and aberrations of the focused light throughout the entire area of the imaging device need to be reduced. Therefore, demand has increased for a high-performance zoom lens system mounted in a small-sized imaging apparatus and capable of focusing light of small aberration throughout the entire area of the imaging device.

Also, as the importance of security has recently increased, a surveillance camera or a precision measurement camera for closed-circuit television (CCTV) has become more widely used by individuals, as well as public organizations or companies. Because a surveillance camera is used at night as well as during the day, a zoom lens system used in a surveillance camera needs to be capable of correcting aberrations from a visible ray region to a near-infrared ray region, and should have a smaller F-number, in order to obtain clear images with less noise even in an environment of low light intensity.

SUMMARY

One or more example embodiments provide a zoom lens system, and more particularly, to a three-group zoom lens system.

According to an aspect of an example embodiment, there is provided a zoom lens system including a first lens group having a negative refractive power and including at least one doublet lens, the doublet lens including two lenses, a second lens group having a positive refractive power, and a third lens group having a positive refractive power, wherein the first lens group, the second lens group, and the third lens group are sequentially disposed from an object side to an image plane side along an optical axis of the zoom lens system, wherein the first lens group and the second lens group are configured to move along the optical axis to perform zooming and focusing, wherein $3.0<Vdf/Vdr<6.0$, where Vdf denotes an Abbe number of a lens arranged at the object side in the doublet lens, and Vdr denotes an Abbe number of a lens arranged at the image plane side in the doublet lens.

The first lens group may include five lenses, and the five lenses may include a first lens having a negative refractive power, a second lens having a negative refractive power, a third lens having a negative refractive power, a fourth lens having a positive refractive power, and a fifth lens having a negative refractive power, wherein a surface of the third lens and a surface of the fourth lens are attached to form the doublet lens.

The zoom lens system, wherein $Vd1<60$, $Vd2<25$, and $Vd5<50$, where Vd1, Vd2, and Vd5 respectively denote Abbe numbers of the first lens, the second lens, and the fifth lens.

The second lens group may include five lenses, and the five lenses may include a sixth lens having a positive refractive power, a seventh lens having a positive refractive power, an eighth lens having a negative refractive power, a ninth lens having a positive refractive power, and a tenth lens having a negative refractive power.

The sixth lens and the tenth lens may each include an aspherical surface, respectively, wherein $Vd6>40$, and $Vd10>70$, where Vd6 and Vd10 respectively denote Abbe numbers of the sixth lens and the tenth lens.

The third lens group may include an eleventh lens having a positive refractive power and a twelfth lens having a negative refractive power, a surface of the eleventh lens and a surface of the twelfth lens being attached to each other and form a doublet lens, wherein $Vd11/Vd12<0.9$, where Vd11 and Vd12 respectively denote Abbe numbers of the eleventh lens and the twelfth lens.

The zoom lens system, wherein $0.9<Fno<1.1$, where Fno denotes an F-number of the zoom lens system.

The zoom lens system, wherein $0.8<-f1/f2<1$, and $f2/f3<0.5$, where f1 denotes a focal distance of the first lens group, f2 denotes a focal distance of the second lens group, and f3 denotes a focal distance of the third lens group.

The total number of lenses included in the first to third lens groups may be at least twelve.

According to an aspect of an example embodiment, there is provided a zoom lens system including a first lens group having a negative refractive power and including at least five lenses, a second lens group having a positive refractive power, and a third lens group having a positive refractive power, wherein the first lens group, the second lens group, and the third lens group are sequentially disposed from an object side to an image plane side along an optical axis of the zoom lens system, and wherein the first lens group and the second lens group are configured to move along the optical axis to perform zooming and focusing, and wherein $0.9<Fno<1.2$, where Fno denotes an F-number of the zoom lens system.

The at least five lenses may include, sequentially from the object side to the image plane side a first lens having a negative refractive power, a second lens having a negative refractive power, a third lens having a negative refractive power, a fourth lens having a positive refractive power, and a fifth lens having a negative refractive power.

The surface of the third lens and a surface of the fourth lens are attached to each other and form a doublet lens, wherein $3.0<Vdf/Vdr<6.0$, where Vdf denotes an Abbe number of a lens arranged at the object side in the doublet lens, and Vdr denotes an Abbe number of a lens arranged at the image plane side in the doublet lens.

The zoom lens system, wherein $0.8<-f1/f2<1$, and $f2/f3<0.5$, where f1 denotes a focal distance of the first lens group, f2 denotes a focal distance of the second lens group, and f3 denotes a focal distance of the third lens group.

The second lens group may include least five lenses.

The five lenses included in the second lens group may include a sixth lens having a positive refractive power, a seventh lens having a positive refractive power, an eighth lens having a negative refractive power, a ninth lens having a positive refractive power, and a tenth lens having a negative refractive power.

The surface of the eighth lens and a surface of the ninth lens may be attached to each other and form a doublet lens.

The surface on the object side of the sixth lens and a surface on the image plane side of the tenth lens may include an aspherical surface, respectively.

The total number of lenses included in the first to third lens groups may be at least twelve.

According to an aspect of an example embodiment, there is provided a zoom lens system including a first lens group having a negative refractive power, a second lens group having a positive refractive power, and a third lens group having a positive refractive power, wherein the first lens group, the second lens group, and the third lens group are sequentially disposed from an object side to an image plane side along an optical axis of the zoom lens system, and wherein the first lens group and the second lens group are configured to move along the optical axis to perform zooming and focusing, and the first lens group includes five lenses.

BRIEF DESCRIPTION OF THE DRAWINGS

The above and other aspects, features, and advantages of certain embodiments of the present disclosure will become apparent and more readily appreciated from the following description of the example embodiments, taken in conjunction with the accompanying drawings in which:

FIG. 9 is a diagram showing a longitudinal spherical aberration, astigmatic field curvature, and distortion of the zoom lens system according to the embodiment of FIG. 7 with a telephoto end.

DETAILED DESCRIPTION

Figure 1:
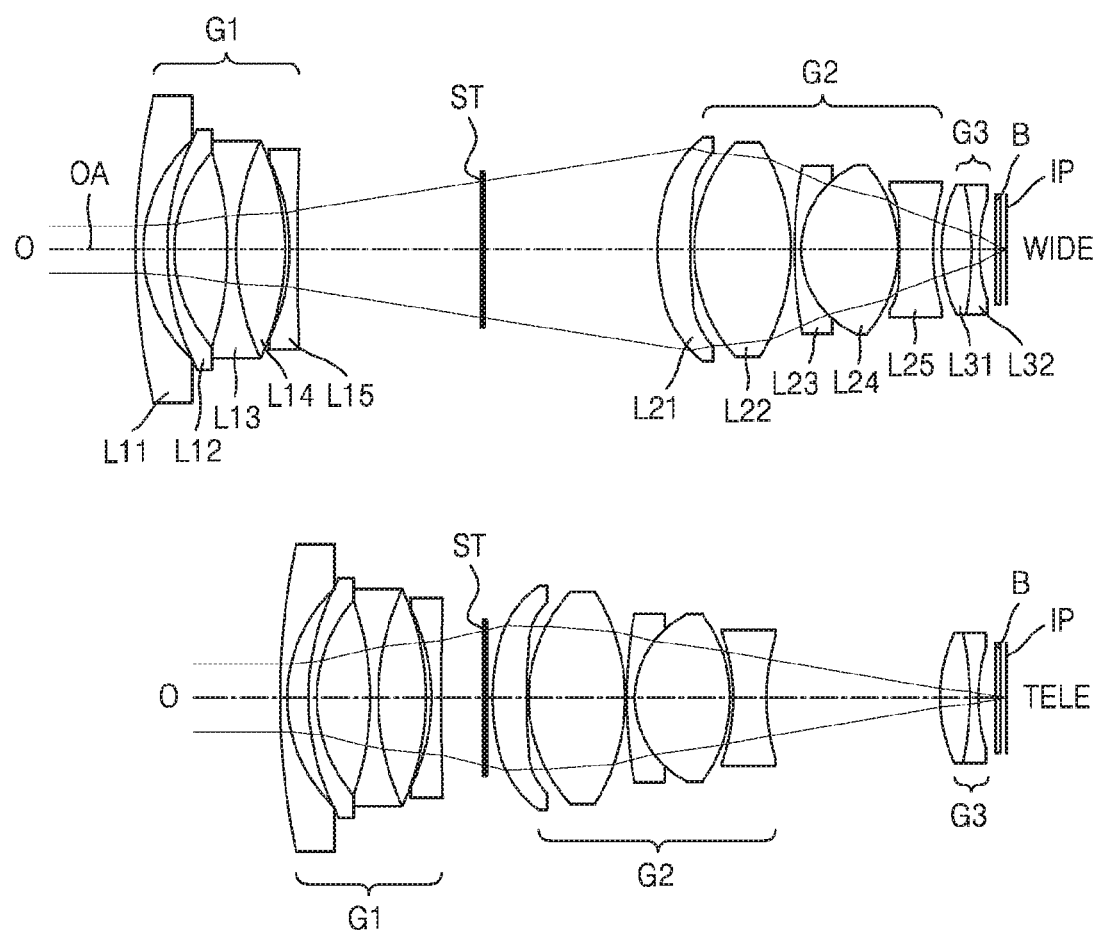
FIG. 1 is a diagram of optical arrangements of a zoom lens system at a wide-angle end and a telephoto end according to an example embodiment.

Reference will now be made in detail to example embodiments, examples of which are illustrated in the accompanying drawings, wherein like reference numerals refer to like elements throughout. The example embodiments may have different forms and should not be construed as being limited to the descriptions set forth herein. Accordingly, example embodiments are merely described below, by referring to the figures, to explain aspects of the present disclosure.

As the present disclosure allows for various changes and numerous embodiments, example embodiments will be illustrated in the drawings and described in detail in the written description. The attached drawings for illustrating one or more example embodiments are referred to in order to gain a sufficient understanding, the merits thereof, and the objectives accomplished by the implementation. However, example embodiments may have different forms and should not be construed as being limited to the descriptions set forth herein.

The example embodiments will be described below in more detail with reference to the accompanying drawings. Those components that are the same or are in correspondence are rendered the same reference numeral regardless of the figure number, and redundant explanations are omitted.

While such terms as "first," "second," etc., may be used to describe various components, such components must not be limited to the above terms. The above terms are used only to distinguish one component from another.

An expression used in the singular encompasses the expression of the plural, unless it has a clearly different meaning in the context.

In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Expressions such as "at least one of", when preceding a list of components, modify the entire list of components and do not modify the individual components of the list. For example, the expression, "at least one of a, b, and c," should be understood as including only a, only b, only c, both a and b, both a and c, both b and c, or all of a, b, and c.

Sizes of components in the drawings may be exaggerated for convenience of explanation. In other words, since sizes and thicknesses of components in the drawings are arbitrarily illustrated for convenience of explanation, the following example embodiments are not limited thereto.

Figure 4:
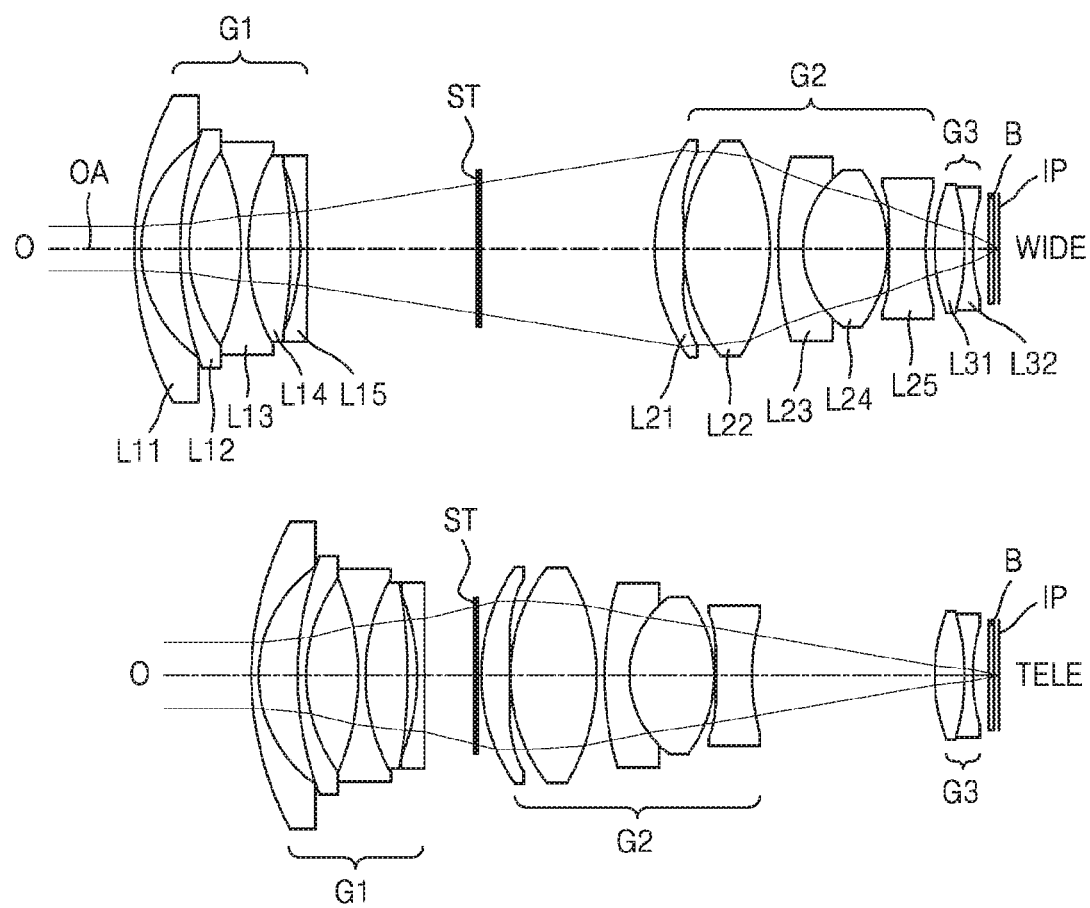
FIG. 4 is a diagram of optical arrangements of a zoom lens system at a wide-angle end and a telephoto end according to an example embodiment with a wide-angle end and a telephoto end.
Figure 7:
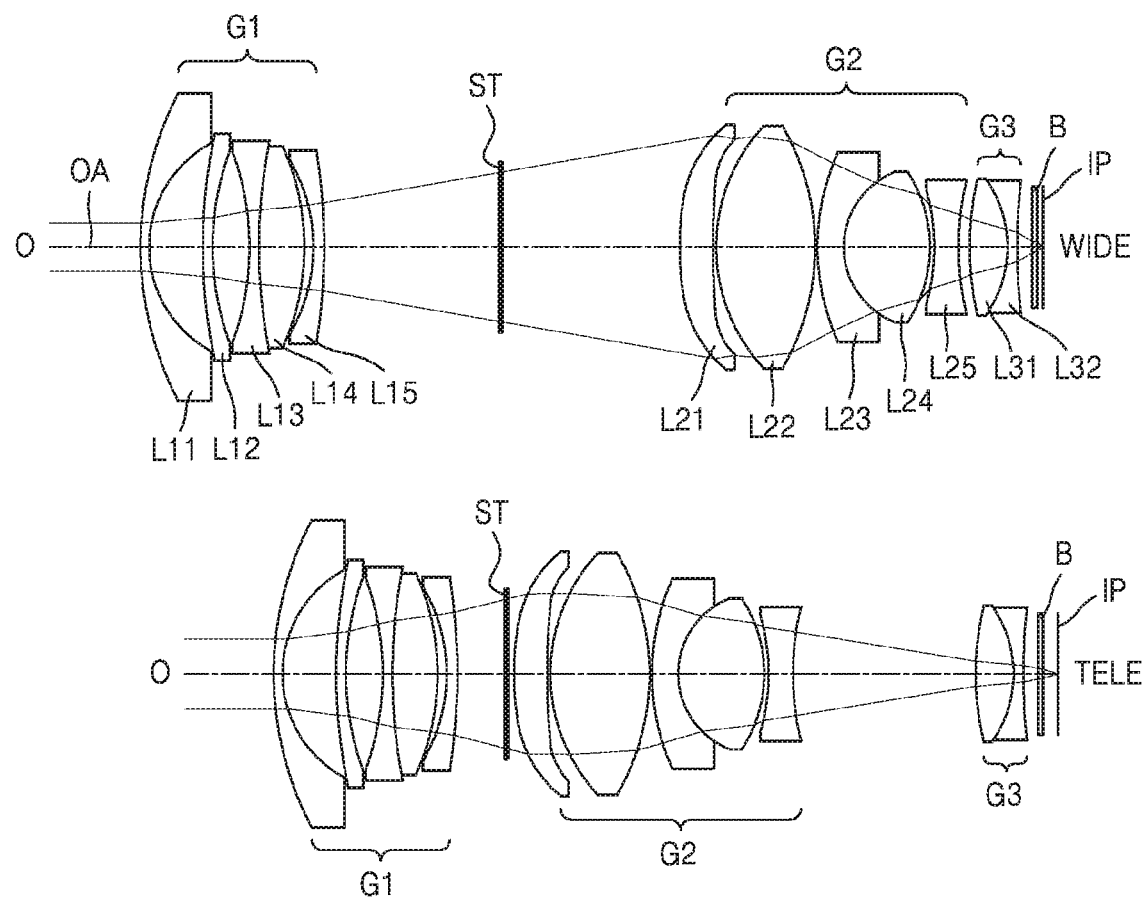
FIG. 7 is a diagram of optical arrangements of a zoom lens system at a wide-angle end and a telephoto end according to an example embodiment.

Referring to FIGS. 1, 4, and 7, a zoom lens system according to example embodiments may include, sequentially from an object O side to an image plane IP side, a first lens group G1 having a negative refractive power, a second lens group G2 having a positive refractive power, and a third lens group G3 having a positive refractive power, and an aperture stop ST arranged between the first lens group G1 and the second lens group G2, and an optical block B which may be arranged between the third lens group G3 and the image plane IP.

According to an example embodiment, a chromatic aberration of the zoom lens system may be sufficiently reduced or corrected from a visible ray band to a near-infrared ray band, and thus, may be applied to an imaging apparatus such as a surveillance camera used at night, as well as during the day.

According to an example embodiment, the optical block B may be a near-infrared ray cut-off filter and/or a cover glass, and the near-infrared ray cut-off filter may be turned on/turned off by a controller. For example, the near-infrared ray cut-off filter may be arranged between the third lens group G3 and the image plane IP on an optical path of the incident light because photographing by the zoom lens system may be performed by using visible ray during the day, and may be arranged on an outer portion of the optical path of the incident light because the photographing may be performed by using near-infrared ray at night. In FIGS. 1, 4, and 7, only one optical block B is shown, but a zoom lens system according to an example embodiment may include two or more optical blocks.

The zoom lens system may perform zooming and focusing operations by moving the first lens group G1 and the second lens group G2 along an optical axis. For example, the zoom lens system may perform zooming by moving the second lens group G2 and perform focusing by moving the first lens group G1. The third lens group G3 may have a fixed position, and the aperture stop ST may be at a fixed location.

The zoom lens system according to an example embodiment may perform the zooming operation to the wide-angle end and to the telephoto end, and thus, optical performance may be improved in the near-infrared ray band as well as in the visible ray band. Referring to FIGS. 2, 3, 5, 6, 8, and 9, a difference between focusing locations of the light at the wide-angle end and the telephoto end of a wavelength 546.07 nm corresponding to green light and a wavelength of 850 nm corresponding to near-infrared ray is very small throughout a range from a central portion to a peripheral portion.

Therefore, the difference between the focusing locations of the visible ray and the near-infrared ray throughout the entire area of the image plane IP may be very small, and thus, focus distortion when switching from a day photographing to a night photographing mode may be reduced or prevented, and the photographing of high resolution may be performed at night, as well as during the day. For example, clarity of an image captured at night may be improved, and thus, generation of a double image may be reduced or prevented.

According to an example embodiment, F-number may have a value of about 1 at the wide-angle end and about 2.6 at the telephoto end, and thus, a bright zoom lens system capable of realizing high-resolution images under an environment of lower light intensity may be provided.

According to an example embodiment, a zoom lens system having a zoom ratio of 3.5 to 4 may be provided. That is, a ratio between a focal distance at the wide-angle end and a focal distance at a telephoto end may have a value of 3.5 to 4.

The first lens group G1 has a negative refractive power, and may include five lenses. The first lens group G1 may perform a focusing operation while moving along an optical axis OA, and may include, sequentially from the object O side to the image plane IP side, a first lens L11 having a negative refractive power, a second lens L12 having a negative refractive power, a third lens L13 having a negative refractive power, a fourth lens L14 having a positive refractive power, and a fifth lens L15 having a negative refractive power. The first lens group G1 may include four minus lenses and one plus lens, and a surface of the third lens L13 and a surface of the fourth lens L14 may be attached to each other to configure a doublet lens.

According to an example embodiment, the doublet lens included in the first lens group G1 may satisfy following conditional formula:

$$3.0 < Vdf/Vdr < 6.0 \quad (1),$$

where Vdf denotes an Abbe number of the third lens L13 at the object O side in the doublet lens, and Vdr denotes an Abbe number of the fourth lens L14 at the image plane IP side in the doublet lens.

Vdf and Vdr denote Abbe numbers on a d line having a wavelength of about 587.56 nm, and refractive index and Abbe number provided hereinafter denote refractive index and Abbe number on the d line having a wavelength of about 587.56 nm.

Two lenses included in the doublet lens of the first lens group G1 may satisfy the above conditional formula 1, and may more effectively control aberrations of higher wavelengths via the doublet lens. That is, the chromatic aberration increases at the lowest value 3.0 or less and at the highest value 6.0 or greater of the conditional formula 1, and thus, a difference between the focusing location at the visible ray wavelength and the focusing location at the near-infrared ray wavelength may increase. Due to the difference between the focusing locations, the resolution of the image captured at night may degrade.

Relations between the doublet lens included in the first lens group G1 and Abbe number thereof may be used to improve performance of high-resolution photographing operation both during the night and the day.

According to an example embodiment, the first lens L11, the second lens L12, and the fifth lens L15 included in the first lens group G1 may simultaneously satisfy following conditional formula 2:

$$Vd1 < 60$$

$$Vd2 < 25$$

$$Vd5 < 50 \quad (2),$$

where Vd1, Vd2, and Vd5 respectively denote Abbe numbers of the first lens L11, the second lens L12, and the fifth lens L15.

The first lens L11, the second lens L12, and the fifth lens L15 of the first lens group G1 may largely affect spherical aberrations, and when these lenses satisfy conditional formula 2, the aberration, e.g., the spherical aberration, may be more evenly configured at a peripheral area of the image plane IP, as well as a central area of the image plane IP. That is, increase in the aberration from the center area towards the peripheral area may be reduced.

As described above, the first lens group G1 includes five lenses, and the aberration may be more evenly reduced from the central area toward the peripheral area via the combination of the five lenses in the first lens group G1. Also, the zoom lens system for photographing high resolution images from the visible ray wavelength band to the near-infrared ray wavelength band may be provided by reducing the chromatic aberration.

The second lens group G2 has a positive refractive power, and may include five lenses. The second lens group G2 may be a moving group moving along the optical axis OA during zooming, and may include, sequentially from the object O side to the image plane IP side, a sixth lens L21 having a positive refractive power, a seventh lens L22 having a positive refractive power, an eighth lens L23 having a negative refractive power, a ninth lens L24 having a positive refractive power, and a tenth lens L25 having a negative refractive power.

The second lens group G2 may include two minus lenses and three plus lenses, and a surface of the eighth lens L23 and a surface of the ninth lens L24 may be attached to each other to configure a doublet lens.

In the second lens group G2, the sixth lens L21 that is closest to the object O side and the tenth lens L25 that is closest to the image plane IP side may respectively include an aspherical surface and satisfy following conditional formula:

$$Vd6 > 40$$

$$Vd10 > 70 \qquad (3).$$

According to an example embodiment, the sixth lens L21 and the tenth lens L25 may respectively have aspherical surfaces at opposite surfaces thereof.

When at least one surface of the sixth lens L21 is provided as an aspherical surface and Abbe number of the sixth lens L21 is provided to be greater than 40, the spherical aberration may be reduced or corrected. Also, when at least one surface of the tenth lens L25 is provided as an aspherical surface and Abbe number of the tenth lens L25 is provided to be greater than 70, coma aberration occurring on the peripheral area may be reduced or corrected.

That is, when the sixth lens L21 and the tenth lens L25 are provided as above, the spherical aberration of the zoom lens system and the coma aberration on the peripheral portion may be reduced or corrected and the aberrations of the zoom lens system may be reduced or minimized.

According to an example embodiment, the sixth lens L21 and the tenth lens L25 may respectively have aspherical surfaces at opposite surfaces thereof.

The third lens group G3 may have a positive refractive power, and may include two lenses. The third lens group G3 may be a fixed group having a fixed position, and may include, sequentially from the object O side to the image plane IP side, an eleventh lens L31 having a positive refractive power and a twelfth lens L32 having a negative refractive power. The a surface of the eleventh lens L31 and a surface of the twelfth lens L32 may be combined with each other to configure a doublet lens.

According to an example embodiment, the eleventh lens L31 and the twelfth lens L32 may satisfy following conditional formula:

$$Vd11/Vd12 < 0.9 \qquad (4),$$

where Vd11 and Vd12 respectively denote Abbe number of the eleventh lens L31 and the twelfth lens L32.

When the third lens group G3 includes the doublet lens and two lenses in the doublet lens satisfy above conditional formula 4, the chromatic aberration may be reduced or corrected. That is, after the chromatic aberration is reduced by the doublet lens included in the first lens group G1, the chromatic aberration may be additionally corrected by the doublet lens included in the third lens group G3 that is adjacent to the image plane IP side.

According to an example embodiment, the first lens group G1, the second lens group G2, and the third lens group G3 may respectively satisfy following conditional formulae:

$$0.8 < -f1/f2 < 1 \qquad (5)$$

$$f2/f3 < 0.5 \qquad (6),$$

where f1 denotes a focal distance of the first lens group G1, f2 denotes a focal distance of the second lens group G2, and f3 denotes a focal distance of the third lens group G3.

Above conditional formulae 5 and 6 represent conditions about the distribution of the refractive index among the first lens group G1, the second lens group G2, and the third lens group G3, and when the refractive index is distributed to satisfy ranges of the above conditional formulae, a bright zoom lens system may be realized while reducing the aberration.

Through the above configuration, the aberrations may be reduced or corrected on the central area and the peripheral area of a screen, and moreover, the chromatic aberration may be reduced or corrected from the visible ray wavelength band to the near-infrared ray wavelength band. Thus, higher resolution photographing may be performed during the day and the night, and a three-group zoom lens system having a smaller F-number may be provided.

Hereinafter, data for designing the zoom lens system according to example embodiments will be described with reference to Table 1 to Table 10.

In the design data, f denotes a focal distance (mm), Fno denotes F-number, R denotes a radius of curvature of each lens surface (mm) (if R has an infinity value, it denotes that the surface is a plane), and Dn is a distance (mm) between lens surfaces on an optical axis, that is, a lens thickness or a distance between lenses. Nd denotes a refractive index of each lens on the d line, and Vd denotes an Abbe number of each lens on the d line.

The aspherical surface ASP according to example embodiments may be defined as follows:

$$z = \frac{ch^2}{1 + \sqrt{1 - (1+K)c^2h^2}} + Ah^4 + Bh^6 + Ch^8 + Dh^{10}. \qquad (7)$$

The aspherical surface included in the zoom lens system according to example embodiments may be represented by the above definition, where a proceeding direction of the ray is a positive direction when an optical axis direction is a z-axis and a direction perpendicular to the optical axis direction is an h-axis. Here, z denotes a distance from a vertex of the lens along the optical axis, h denotes a distance in a direction perpendicular to the optical axis, K denotes a conic constant, A, B, C, and D denote aspherical coefficients, and c denotes a reciprocal number of the radius of curvature (1/R) at the vertex of the lens.

Table 1 shows design data of the zoom lens system according to the example embodiment shown in FIG. 1.

TABLE 1

| Surface number | R | Dn | Nd | Vd |
|---|---|---|---|---|
| S1 | 66.13 | 0.75 | 1.69 | 55.4 |
| S2 | 13.95 | 2.01 | | |
| S3 | 22.57 | 0.75 | 1.94 | 17.9 |
| S4 | 13.62 | 4.91 | | |
| S5 | −29.29 | 0.75 | 1.43 | 95.1 |
| S6 | 22.37 | 4.53 | 1.92 | 20.8 |
| S7 | −24.09 | 0.42 | | |
| S8* | −18.15 | 0.80 | 1.76 | 49.2 |
| S9* | 151.76 | D9 | | |
| S10 (ST) | infinity | D10 | | |
| S11* | 21.28 | 3.10 | 1.8 | 45.4 |
| S12* | 85.96 | 0.20 | | |
| S13 | 14.67 | 9.00 | 1.43 | 95.1 |
| S14 | −18.62 | 0.20 | | |
| S15 | 48.43 | 0.75 | 1.80 | 25.4 |
| S16 | 8.65 | 8.78 | 1.49 | 81.6 |
| S17 | −12.74 | 0.20 | | |
| S18* | −613 | 3.12 | 1.49 | 81.5 |
| S19* | 10.85 | D19 | | |

TABLE 1-continued

| Surface number | R | Dn | Nd | Vd |
|---|---|---|---|---|
| S20 | 14.05 | 2.80 | 1.94 | 17.9 |
| S21 | −28.24 | 0.75 | 1.80 | 22.7 |
| S22 | 16.28 | 1.5 | | |
| S23 | infinity | 0.5 | 1.52 | 58.5 |
| S24 | Infinity | 0.5 | | |
| S25 (IP) | Infinity | 0 | | |

In the above table, * denotes an aspherical surface. Table 2 shows aspherical coefficients of aspherical surfaces included in the zoom lens system according to the example embodiment shown in FIG. 1. In values of the aspherical coefficients, E-m (m is an integer) denotes×$10^{-m}$.

TABLE 2

| Surface number | aspherical coefficients | | | | |
|---|---|---|---|---|---|
| | K | A | B | C | D |
| S8 | −1.0 | 3.30E−05 | −6.76E−07 | 3.06E−09 | 1.24E−11 |
| S9 | −1.0 | 2.67E−05 | −5.62E−07 | −2.90E−10 | 3.77E−11 |
| S11 | −1.0 | 7.06E−05 | 5.79E−07 | 9.11E−10 | 7.03E−12 |
| S12 | 10.0 | 1.24E−04 | 1.06E−06 | 4.29E−10 | 6.08E−11 |
| S18 | 0 | −9.12E−04 | 4.22E−06 | 5.65E−08 | −1.13E−09 |
| S19 | 1 | −1.16E−03 | 5.52E−06 | 8.26E−08 | −2.81E−09 |

Table 3 shows focal distance (f), F-number (Fno), viewing angle (FOV), and variable distance of the zoom lens system according to the example embodiment shown in FIG. 1 with respect to the wide-angle end and the telephoto end.

TABLE 3

| | wide-angle end | telephoto end |
|---|---|---|
| f | 4.3 | 15.6 |
| Fno | 0.98 | 2.44 |
| FOV | 61.3 | 15.7 |
| D9 | 16.9 | 4.1 |
| D10 | 15.9 | 0.5 |
| D19 | 0.7 | 16.1 |
| f1 | | −13.7 |
| f2 | | 15.1 |
| f3 | | 35.2 |

Referring to Table 3, the zoom lens system according to an example embodiment may be identified as a bright zoom lens system, F-number (Fno) having a value of 1 at the wide-angle end. The bright zoom lens system may be implemented by more evenly distributing the refractive power to the lenses included in the first lens group G1 and the second lens group G2, when the entire refractive power of the first lens group G1 and the second lens group G2 is obtained.

Figure 2:
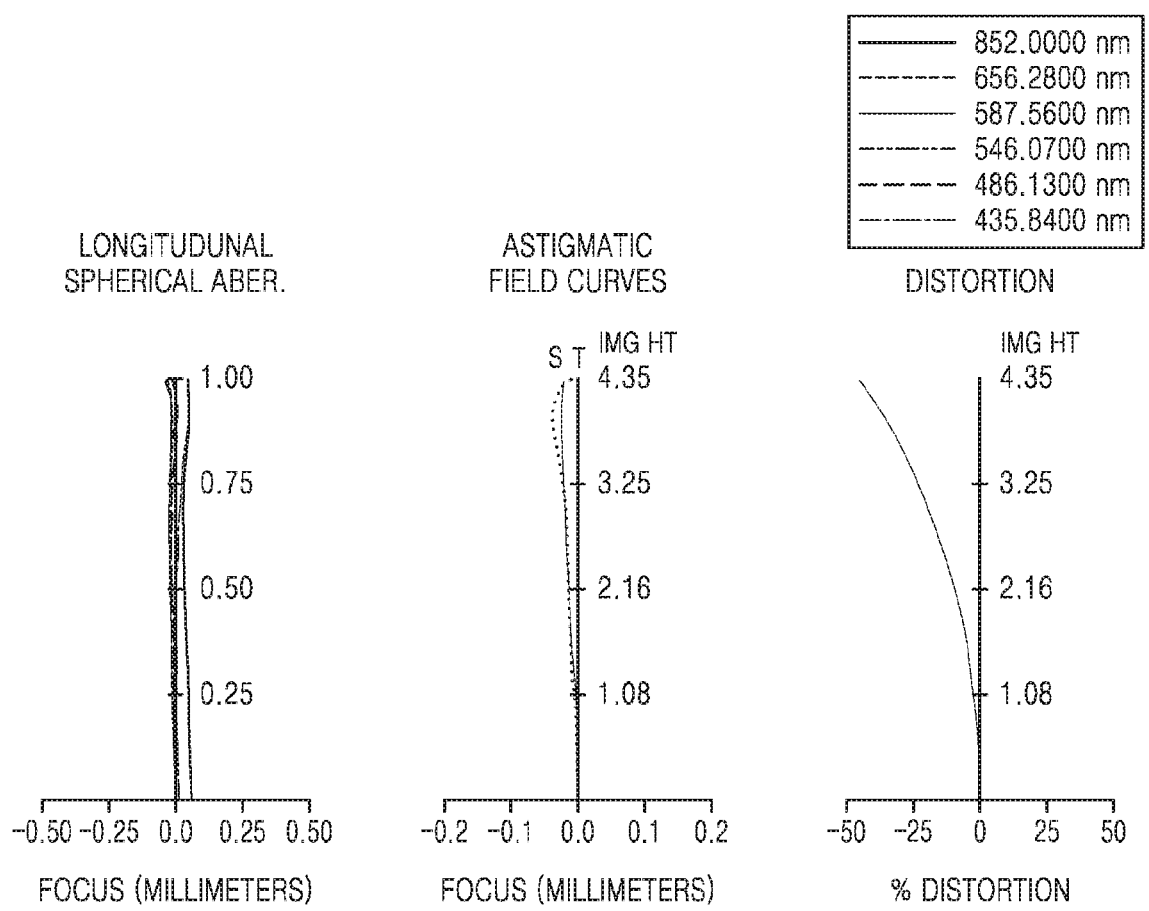
FIG. 2 is a diagram showing a longitudinal spherical aberration, astigmatic field curvature, and distortion of the zoom lens system according to the embodiment of FIG. 1 with a wide-angle end.
Figure 3:
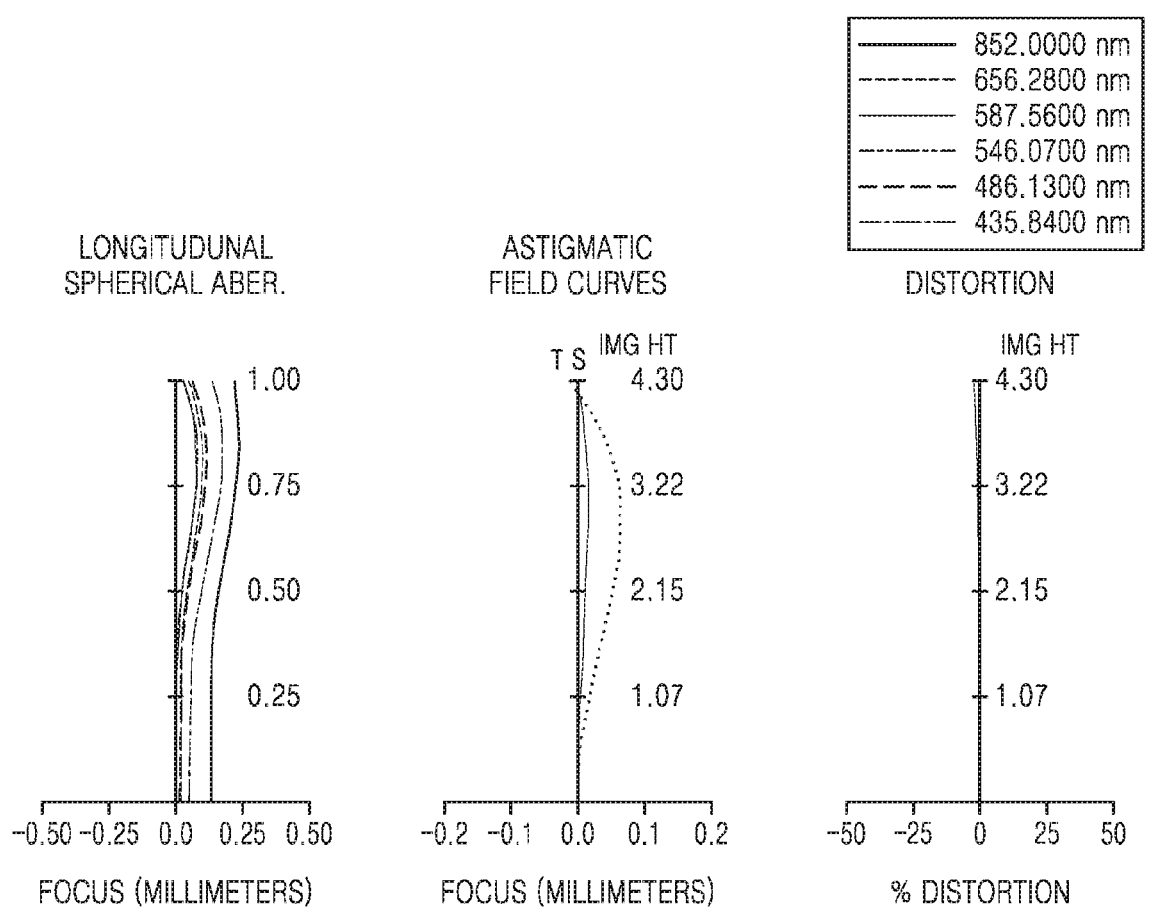
FIG. 3 is a diagram showing a longitudinal spherical aberration, astigmatic field curvature, and distortion of the zoom lens system according to the embodiment of FIG. 1 with a telephoto end.

FIG. 2 is a diagram showing a longitudinal spherical aberration, astigmatic field curvature, and distortion of the zoom lens system according to an example embodiment at the wide-angle end, and FIG. 3 is a diagram showing a longitudinal spherical aberration, astigmatic field curvature, and distortion of the zoom lens system according to an example embodiment at the telephoto end.

The longitudinal spherical aberration of FIGS. 2 and 3 are shown with respect to light having wavelengths of 850 nm, 656.28 nm, 546.07 nm, 486.13 nm, and 435.84 nm, and the astigmatic field curvature and the distortion are shown with respect to the light having a wavelength of 587.56 nm. As the astigmatic field curvature, a dotted line denotes a tangential surface (T) and a solid line denotes a sagittal surface (S).

Referring to FIG. 2, the aberration may be sufficiently reduced or corrected throughout the entire image height from a central to a peripheral area of the image plane IP at the wide-angle end, and in particular, referring to the longitudinal spherical aberration, a very small chromatic aberration may be shown from the central to the peripheral area of the image plane IP from the blue light band of a wavelength of 435.84 nm to the near-infrared ray band of a wavelength of 850 nm. Referring to FIG. 3, it is shown that the aberration is sufficiently reduced or corrected at the telephoto end.

Table 4 shows design data of the zoom lens system according to an example embodiment shown in FIG. 4. A surface number Si denotes an i-th surface, when a surface of the first lens L11 at the object side is a first surface S1 and the surface number increases towards the image plane side.

TABLE 4

| Surface number | R | Dn | Nd | Vd |
|---|---|---|---|---|
| S1 | 30.79 | 0.75 | 1.69 | 55.4 |
| S2 | 12.56 | 3.49 | | |
| S3 | 31.24 | 0.75 | 1.94 | 17.9 |
| S4 | 15.11 | 4.73 | | |
| S5 | −23.45 | 0.75 | 1.43 | 95.1 |
| S6 | 18.60 | 3.93 | 1.92 | 20.8 |
| S7 | −48.52 | 0.84 | | |
| S8 | −22.65 | 0.75 | 1.80 | 46.5 |
| S9 | −274.26 | D9 | | |
| S10 (ST) | infinity | D10 | | |
| S11* | 21.09 | 2.65 | 1.61 | 63.8 |
| S12* | 527.79 | 0.20 | | |
| S13 | 16.85 | 7.88 | 1.43 | 95.1 |
| S14 | −19.25 | 0.67 | | |
| S15 | 33.52 | 2.32 | 1.80 | 25.4 |
| S16 | 9.03 | 7.78 | 1.43 | 95.1 |
| S17 | −12.57 | 0.20 | | |
| S18* | 592.16 | 3.35 | 1.49 | 81.5 |
| S19* | 12.20 | D19 | | |
| S20 | 17.46 | 2.76 | 1.94 | 17.9 |
| S21 | −19.77 | 0.75 | 1.80 | 22.7 |
| S22 | 19.38 | 1.5 | | |
| S23 | infinity | 0.5 | 1.52 | 58.5 |
| S24 | infinity | 0.5 | | |
| S25 (IP) | infinity | 0 | | |

In the above table, * denotes an aspherical surface. Table 4 shows aspherical coefficients of aspherical surfaces included in the zoom lens system according to the example embodiment shown in FIG. 1. In values of the aspherical coefficients, E-m (m is an integer) denotes×$10^{-m}$.

TABLE 5

| Surface number | aspherical coefficients | | | | |
|---|---|---|---|---|---|
| | K | A | B | C | D |
| S11 | −1.0 | 2.80E−05 | 5.47E−07 | 1.90E−09 | −2.17E−11 |
| S12 | 10.0 | 9.17E−05 | 7.82E−07 | 4.45E−09 | −2.29E−11 |
| S18 | 0 | −7.19E−04 | 8.41E−07 | 5.58E−08 | −7.74E−10 |
| S19 | 1 | −8.67E−04 | 1.34E−06 | 9.83E−08 | −1.68E−09 |

Table 6 shows focal distance (f), F-number (Fno), viewing angle (FOV), and variable distance of the zoom lens system according to the example embodiment shown in FIG. 4 with respect to the wide-angle end and the telephoto end.

TABLE 6

|   | wide-angle end | telephoto end |
|---|---|---|
| f | 4.3 | 15.6 |
| Fno | 1.05 | 2.54 |
| FOV | 61.5 | 15.7 |
| D9 | 15.8 | 4.4 |
| D10 | 16.1 | 0.5 |
| D19 | 0.8 | 16.4 |
| f1 |  | −12.8 |
| f2 |  | 14.8 |
| f3 |  | 43.1 |

Referring to Table 6, the zoom lens system according to an example embodiment may be identified as a bright zoom lens system, F-number (Fno) having a value of 1 at the wide-angle end. The bright zoom lens system may be implemented by evenly distributing the refractive power to the lenses included in the first lens group G1 and the second lens group G2, when the entire refractive power of the first lens group G1 and the second lens group G2 is obtained.

Figure 5:
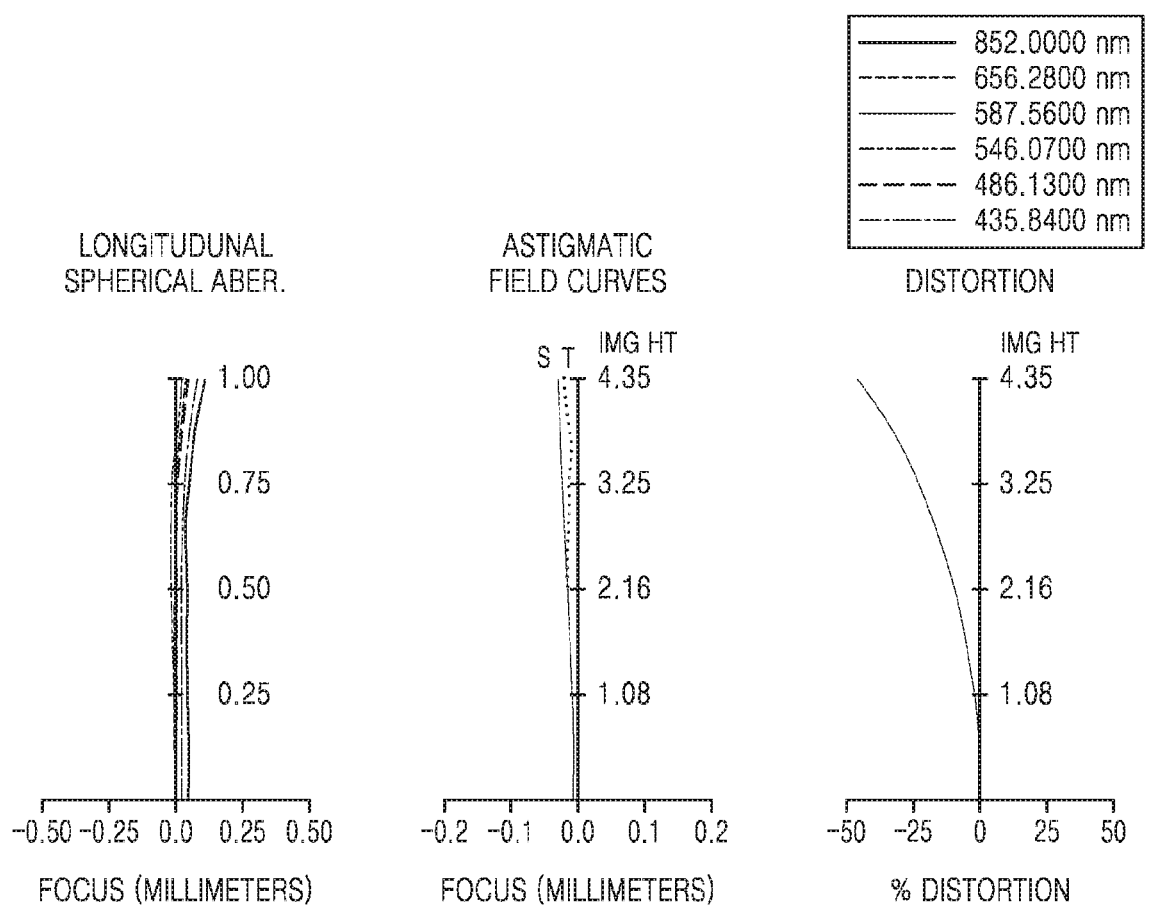
FIG. 5 is a diagram showing a longitudinal spherical aberration, astigmatic field curvature, and distortion of the zoom lens system according to the embodiment of FIG. 4 with a wide-angle end.
Figure 6:
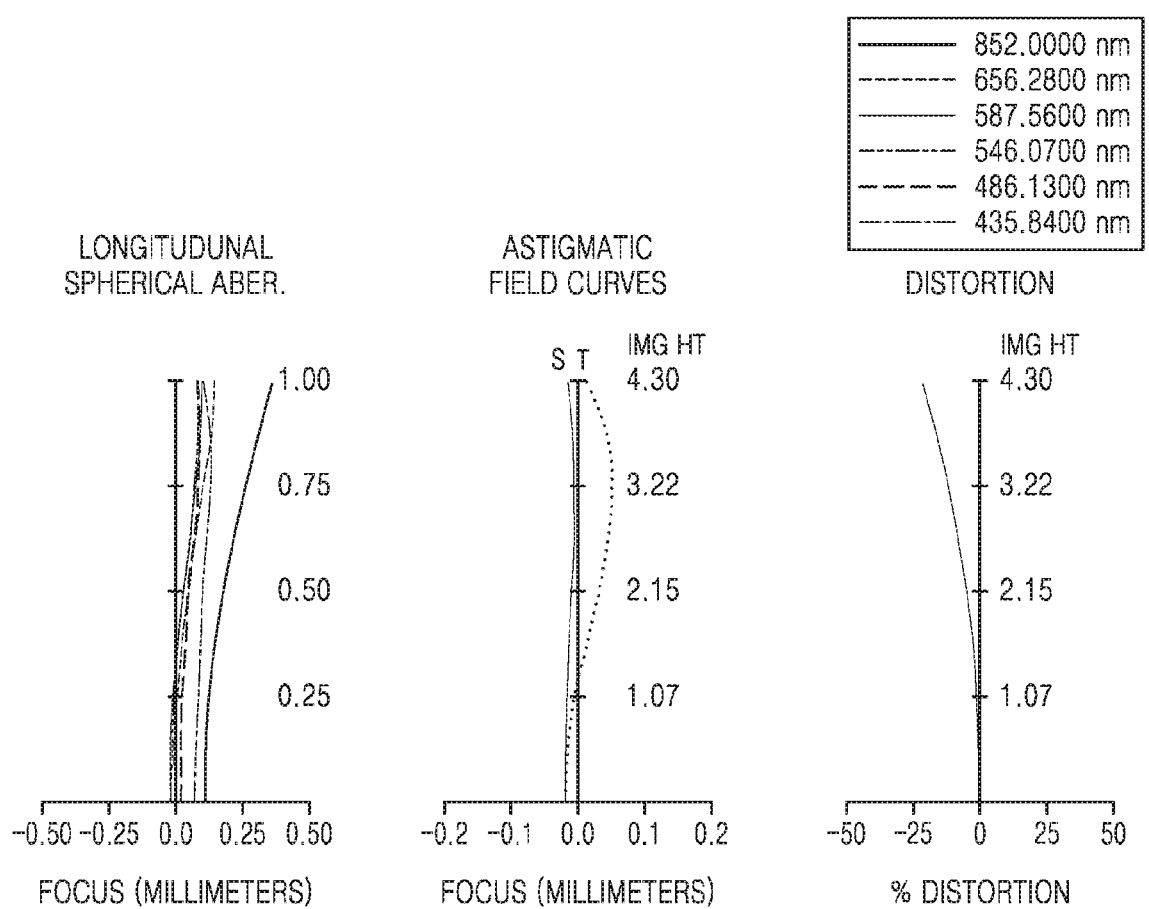
FIG. 6 is a diagram showing a longitudinal spherical aberration, astigmatic field curvature, and distortion of the zoom lens system according to the embodiment of FIG. 4 with a telephoto end.

FIG. 5 is a diagram showing a longitudinal spherical aberration, astigmatic field curvature, and distortion of the zoom lens system according to an example embodiment at the wide-angle end, and FIG. 6 is a diagram showing a longitudinal spherical aberration, astigmatic field curvature, and distortion of the zoom lens system according to an example embodiment at the telephoto end.

The longitudinal spherical aberration of FIGS. 5 and 6 are shown with respect to light having wavelengths of 850 nm, 656.28 nm, 546.07 nm, 486.13 nm, and 435.84 nm, and the astigmatic field curvature and the distortion are shown with respect to the light having a wavelength of 587.56 nm. As the astigmatic field curvature, a dotted line denotes a tangential surface (T) and a solid line denotes a sagittal surface (S).

Referring to FIG. 5, the aberration may be sufficiently reduced or corrected throughout entire image height from a center to a peripheral area of the image plane IP at the wide-angle end, and in particular, referring to the longitudinal spherical aberration, a very small chromatic aberration is shown from the central to the peripheral area of the image plane IP throughout the blue light band of a wavelength of 435.84 nm to the near-infrared ray band of a wavelength of 850 nm. Referring to FIG. 6, it is identified that the aberration is sufficiently reduced or corrected at the telephoto end.

Table 7 shows design data of the zoom lens system according to the example embodiment shown in FIG. 7.

TABLE 7

| Surface number | R | Dn | Nd | Vd |
|---|---|---|---|---|
| S1 | 30.15 | 0.75 | 1.77 | 49.6 |
| S2 | 10.48 | 4.85 |  |  |
| S3 | 48.85 | 0.75 | 1.94 | 17.9 |
| S4 | 23.08 | 3.34 |  |  |
| S5 | −23.06 | 0.75 | 1.43 | 95.1 |
| S6 | 40.77 | 4.04 | 1.92 | 20.8 |
| S7 | −22.15 | 0.80 |  |  |
| S8* | −15.19 | 1.00 | 1.76 | 49.2 |
| S9* | −73.54 | D9 |  |  |
| S10 (ST) | infinity | D10 |  |  |
| S11* | 21.70 | 3.10 | 1.61 | 63.8 |
| S12* | 316.4811 | 0.20 |  |  |
| S13 | 15.66 | 8.74 | 1.43 | 95.1 |
| S14 | −20.87 | 0.20 |  |  |
| S15 | 20.21 | 2.39 | 1.80 | 25.4 |

TABLE 7-continued

| Surface number | R | Dn | Nd | Vd |
|---|---|---|---|---|
| S16 | 7.08 | 7.49 | 1.43 | 95.1 |
| S17 | −12.45 | 0.47 |  |  |
| S18* | −52.54 | 2.14 | 1.49 | 81.5 |
| S19* | 11.84 | D19 |  |  |
| S20 | 27.56 | 3.41 | 1.94 | 17.9 |
| S21 | −9.67 | 0.75 | 1.80 | 22.7 |
| S22 | 36.52 | 1.46 |  |  |
| S23 | infinity | 0.5 | 1.52 | 58.5 |
| S24 | Infinity | 0.5 |  |  |
| S25 (IP) | Infinity | 0 |  |  |

In the above table, * denotes an aspherical surface. Table 8 shows aspherical coefficients of aspherical surfaces included in the zoom lens system according to the example embodiment shown in FIG. 7. In values of the aspherical coefficients, E-m (m is an integer) denotes $\times 10^{-m}$.

TABLE 8

| Surface number | aspherical coefficients | | | | |
|---|---|---|---|---|---|
|  | K | A | B | C | D |
| S8 | 0 | −3.28E−05 | 1.35E−06 | −2.12E−08 | 1.53E−10 |
| S9 | 0 | −6.01E−05 | 1.18E−06 | −2.07E−08 | 1.51E−10 |
| S11 | −1.0 | 3.79E−05 | 2.68E−07 | 4.91E−09 | −1.09E−11 |
| S12 | 10.0 | 1.01E−04 | 5.49E−07 | 5.39E−09 | 1.65E−11 |
| S18 | 0 | −1.06E−03 | 1.77E−05 | −2.04E−07 | 1.84E−09 |
| S19 | 1 | −1.22E−03 | 2.11E−05 | −3.34E−07 | 2.43E−09 |

Table 9 shows focal distance (f), F-number (Fno), viewing angle (FOV), and variable distance of the zoom lens system according to the embodiment shown in FIG. 7 with respect to the wide-angle end and the telephoto end.

TABLE 9

|   | wide-angle end | telephoto end |
|---|---|---|
| f | 4.3 | 15.7 |
| Fno | 1.01 | 2.62 |
| FOV | 60.9 | 15.8 |
| D9 | 15.5 | 4.3 |
| D10 | 15.8 | 0.5 |
| D19 | 1.0 | 16.3 |
| f1 |  | −12.6 |
| f2 |  | 14.6 |
| f3 |  | 36.5 |

Referring to Table 9, the zoom lens system according to an example embodiment may be identified as a bright zoom lens system, F-number (Fno) having a value of 1 at the wide-angle end. The bright zoom lens system may be implemented by more evenly distributing the refractive power to the lenses included in the first lens group G1 and the second lens group G2, when the entire refractive power of the first lens group G1 and the second lens group G2 is obtained.

Figure 8:
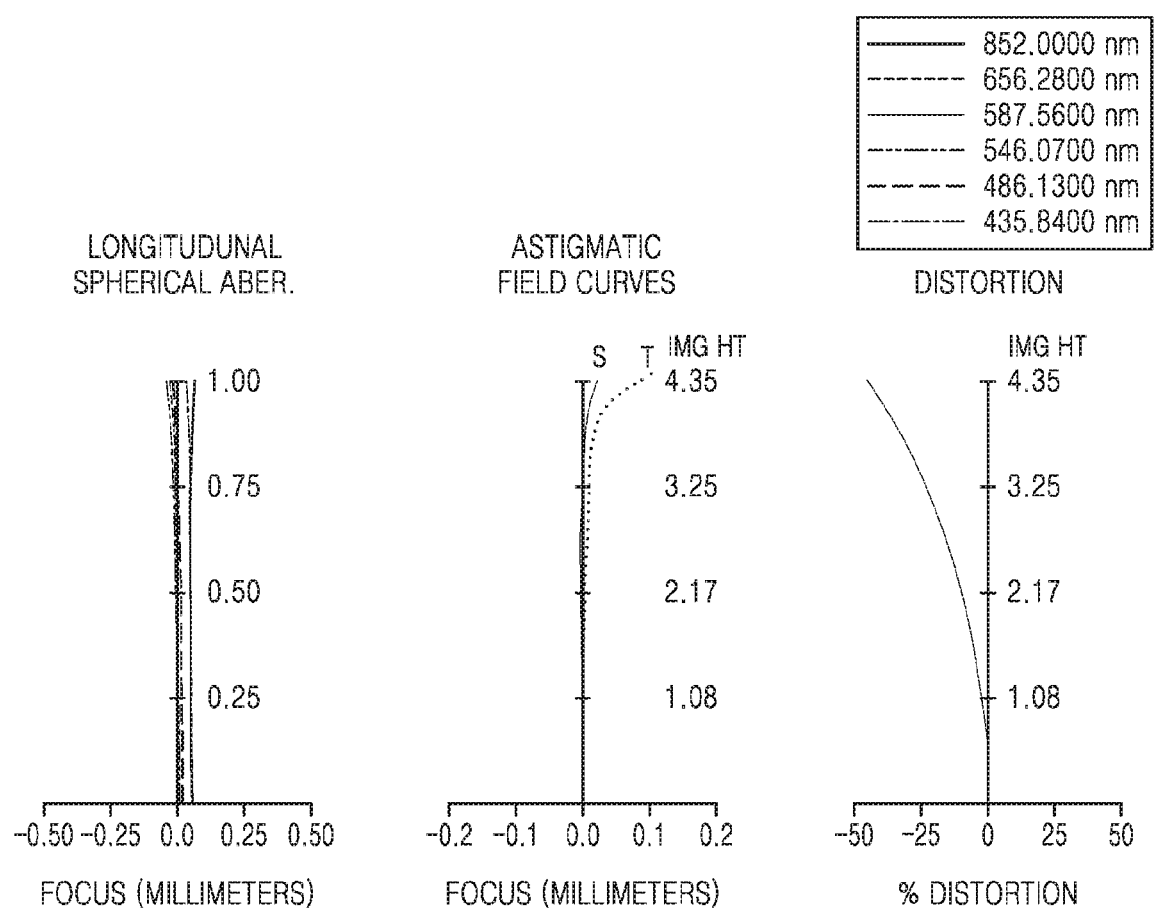
FIG. 8 is a diagram showing a longitudinal spherical aberration, astigmatic field curvature, and distortion of the zoom lens system according to the embodiment of FIG. 7 with a wide-angle end.

FIG. 8 is a diagram showing a longitudinal spherical aberration, astigmatic field curvature, and distortion of the zoom lens system according to an example embodiment at the wide-angle end, and FIG. 9 is a diagram showing a longitudinal spherical aberration, astigmatic field curvature, and distortion of the zoom lens system according to an example embodiment at the telephoto end.

The longitudinal spherical aberration of FIGS. 8 and 9 is shown with respect to light having wavelengths of 850 nm, 656.28 nm, 546.07 nm, 486.13 nm, and 435.84 nm, and the astigmatic field curvature and the distortion are shown with respect to the light having a wavelength of 587.56 nm. As the astigmatic field curvature, a dotted line denotes a tangential surface (T) and a solid line denotes a sagittal surface (S).

Referring to FIG. 8, the aberration may be sufficiently reduced or corrected throughout entire image height from a central to a peripheral area of the image plane IP at the wide-angle end, and in particular, referring to the longitudinal spherical aberration, a very small chromatic aberration is shown from the central to the peripheral area of the image plane IP throughout the blue light band of a wavelength of 435.84 nm to the near-infrared ray band of a wavelength of 850 nm. Referring to FIG. 9, it is shown that the aberration is sufficiently reduced or corrected at the telephoto end.

Table 10 below shows that the zoom lens system according to an example embodiments satisfying conditional formula 1, conditional formula 4, conditional formula 5, and conditional formula 6.

TABLE 10

| conditional formula | First embodiment | Second embodiment | Third embodiment |
| --- | --- | --- | --- |
| 3.0 < Vdf/Vdr < 6.0 | 4.572 | 4.572 | 4.572 |
| Vd11/Vd12 < 0.9 | 0.789 | 0.789 | 0.789 |
| 0.8 < −f1/f2 < 1 | 0.91 | 0.86 | 0.86 |
| f2/f3 < 0.5 | 0.42 | 0.34 | 0.40 |

Through the above configuration, the aberrations may be reduced or corrected in the central area and the peripheral area of a screen, and moreover, the chromatic aberration may be reduced or corrected in the visible ray wavelength band to the near-infrared ray wavelength band. Thus, higher resolution photographing may be performed during the day and the night, and a three-group zoom lens system having small F-number may be provided.

While one or more example embodiments have been described with reference to the figures, it will be understood by those of ordinary skill in the art that various changes in form and details may be made therein without departing from the spirit and scope of the inventive concept as defined by the following claims.

What is claimed is:

1. A zoom lens system comprising:
a first lens group having a negative refractive power and comprising at least one doublet lens, the doublet lens comprising two lenses;
a second lens group having a positive refractive power; and
a third lens group having a positive refractive power,
wherein the first lens group, the second lens group, and the third lens group are sequentially disposed from an object side to an image plane side along an optical axis of the zoom lens system,
wherein the first lens group and the second lens group are configured to move along the optical axis to perform zooming and focusing, and
wherein $3.0 < Vdf/Vdr < 6.0$, where Vdf denotes an Abbe number of a lens arranged at the object side in the doublet lens, and Vdr denotes an Abbe number of a lens arranged at the image plane side in the doublet lens.

2. The zoom lens system of claim 1, wherein the first lens group comprises five lenses, and the five lenses comprise:
a first lens having a negative refractive power;
a second lens having a negative refractive power;
a third lens having a negative refractive power;
a fourth lens having a positive refractive power; and
a fifth lens having a negative refractive power,
wherein a surface of the third lens and a surface of the fourth lens are attached to form the doublet lens.

3. The zoom lens system of claim 2, wherein $Vd1 < 60$, $Vd2 < 25$, and $Vd5 < 50$, where Vd1, Vd2, and Vd5 respectively denote Abbe numbers of the first lens, the second lens, and the fifth lens.

4. The zoom lens system of claim 1, wherein the second lens group comprises five lenses, and the five lenses comprise:
a sixth lens having a positive refractive power;
a seventh lens having a positive refractive power;
an eighth lens having a negative refractive power;
a ninth lens having a positive refractive power; and
a tenth lens having a negative refractive power.

5. The zoom lens system of claim 4, wherein the sixth lens and the tenth lens each comprise an aspherical surface, respectively, and
wherein $Vd6 > 40$, and $Vd10 > 70$, where Vd6 and Vd10 respectively denote Abbe numbers of the sixth lens and the tenth lens.

6. The zoom lens system of claim 1, wherein the third lens group comprises an eleventh lens having a positive refractive power and a twelfth lens having a negative refractive power, a surface of the eleventh lens and a surface of the twelfth lens being attached to each other and form a doublet lens, and
wherein $Vd11/Vd12 < 0.9$, where Vd11 and Vd12 respectively denote Abbe numbers of the eleventh lens and the twelfth lens.

7. The zoom lens system of claim 1, wherein $0.9 < Fno < 1.1$, where Fno denotes an F-number of the zoom lens system.

8. The zoom lens system of claim 1, wherein $0.8 < -f1/f2 < 1$, and $f2/f3 < 0.5$, where f1 denotes a focal distance of the first lens group, f2 denotes a focal distance of the second lens group, and f3 denotes a focal distance of the third lens group.

9. The zoom lens system of claim 1, wherein a total number of lenses included in the first to third lens groups is at least twelve.

10. A zoom lens system comprising:
a first lens group having a negative refractive power and comprising at least five lenses;
a second lens group having a positive refractive power; and
a third lens group having a positive refractive power, wherein the first lens group, the second lens group, and the third lens group are sequentially disposed from an object side to an image plane side along an optical axis of the zoom lens system, wherein the first lens group and the second lens group are configured to move along the optical axis to perform zooming and focusing, and wherein $0.9<Fno<1.2$, where Fno denotes an F-number of the zoom lens system.

11. The zoom lens system of claim 10, wherein the at least five lenses comprise, sequentially from the object side to the image plane side:
a first lens having a negative refractive power;
a second lens having a negative refractive power;
a third lens having a negative refractive power;
a fourth lens having a positive refractive power; and
a fifth lens having a negative refractive power.

12. The zoom lens system of claim 11, wherein a surface of the third lens and a surface of the fourth lens are attached to each other and form a doublet lens, and wherein $3.0<Vdf/Vdr<6.0$, where Vdf denotes an Abbe number of a lens arranged at the object side in the doublet lens, and Vdr denotes an Abbe number of a lens arranged at the image plane side in the doublet lens.

13. The zoom lens system of claim 10, wherein $0.8<-f1/f2<1$, and $f2/f3<0.5$, where f1 denotes a focal distance of the first lens group, f2 denotes a focal distance of the second lens group, and f3 denotes a focal distance of the third lens group.

14. The zoom lens system of claim 10, wherein the second lens group comprises at least five lenses.

15. The zoom lens system of claim 14, wherein the five lenses included in the second lens group comprise:
a sixth lens having a positive refractive power;
a seventh lens having a positive refractive power;
an eighth lens having a negative refractive power;
a ninth lens having a positive refractive power; and
a tenth lens having a negative refractive power.

16. The zoom lens system of claim 15, wherein a surface of the eighth lens and a surface of the ninth lens are attached to each other and form a doublet lens.

17. The zoom lens system of claim 15, wherein a surface on the object side of the sixth lens and a surface on the image plane side of the tenth lens comprise an aspherical surface, respectively.

18. The zoom lens system of claim 10, wherein a total number of lenses included in the first to third lens groups is at least twelve.

* * * * *